United States Patent [19]

Borsheim

[11] Patent Number: 5,277,232

[45] Date of Patent: Jan. 11, 1994

[54] POSITIVE DISCHARGE CONTAMINANT EVACUATOR

[76] Inventor: Lewis A. Borsheim, P.O. Box 165, Cummings, N. Dak. 58223

[21] Appl. No.: 871,740

[22] Filed: Apr. 21, 1992

[51] Int. Cl.$^5$ ............................................. B65B 31/04
[52] U.S. Cl. ...................................... 141/65; 141/67; 415/121.2; 415/206
[58] Field of Search ............... 141/65, 67; 415/121.2, 415/203–206; 55/428, 429, 430, 431, 432, 433

[56] References Cited

U.S. PATENT DOCUMENTS

| | | | |
|---|---|---|---|
| 3,542,496 | 11/1970 | Bergeson | 415/206 |
| 3,696,591 | 10/1972 | Bennett et al. | 55/430 |
| 3,759,628 | 9/1973 | Kempf | 415/206 |
| 3,824,029 | 7/1974 | Fabri et al. | 415/206 |
| 4,097,256 | 6/1978 | Borsheim | 415/206 |
| 4,475,868 | 10/1984 | Renger | 415/206 |

*Primary Examiner*—Renee S. Luebke
*Assistant Examiner*—Steven D. Douglas
*Attorney, Agent, or Firm*—Leo Gregory

[57] ABSTRACT

This invention relates to an improvement in an evacuating apparatus attached to an air cleaner such as of an internal combustion engine as in connection with a farm tractor or an industrial engine operating in a dust laden environment where the contaminants drawn into the air cleaner are evacuated by the apparatus herein. The improvement consists in having a more positive evacuation of air transported contaminants in particulate form and evacuated with said contaminants are airborne particles of moisture carried with said contaminants. Comprising the apparatus of the invention is a small sized motor driving an impeller having vanes sweeping through a trough in the direction of exhaust, there being no return passage to the air cleaner.

4 Claims, 3 Drawing Sheets

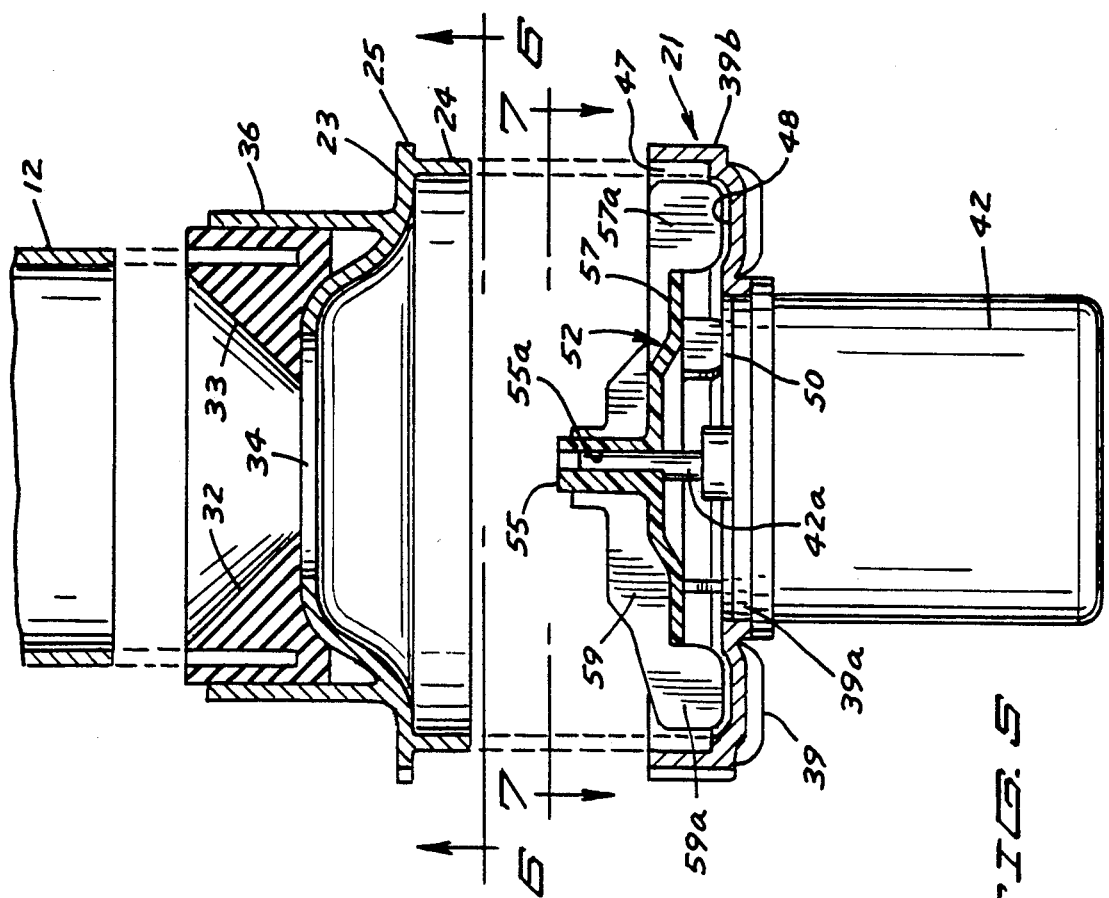
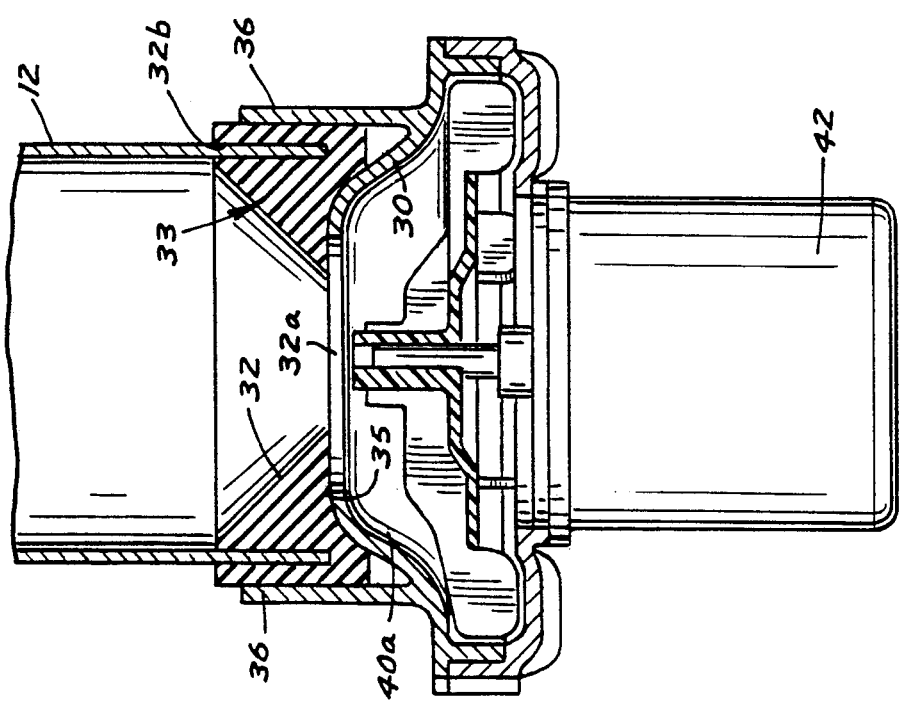

POSITIVE DISCHARGE CONTAMINANT EVACUATOR

BACKGROUND OF THE INVENTION

1. Field of Invention

This invention relates to a dust evacuating apparatus particularly adapted to evacuate contaminants from an air cleaner.

2. Description of the Prior Art

The known art discloses a commonly used exhaust control valve element for the discharge of contaminants from an air cleaner consisting of a flexible pair of lips which expand to open and discharge contaminants by gravity when there is sufficient accumulation. However said lips relying upon flexibility to open and discharge contaminants and to respond to the suction of the engine quickly, the valve element in failing to respond quickly permits the engine to draw a stream of air through the apparatus inwardly in a reverse flow through the outlet of the air cleaner and thus does not have the benefit of the air cleaner in passing into the engine.

It is an object of this invention to provide a powered contaminant evacuating apparatus in connection with an air cleaner which positively discharges contaminants and which prevents any reverse flow into the air cleaner.

It is another object herein to provide a relatively small sized apparatus attached to the outlet pipe of the air cleaner to positively evacuate all contaminants gathered therein.

It is a further object herein to provide an evacuating apparatus which has no reverse path for air flow between its discharge outlet and its intake of contaminants from the air cleaner.

It is a more specific object of this invention to provide a powered evacuating apparatus having a housing having a discharge channel therein and includes an impeller having a blade having portions disposed in said channel to sweep out and discharge all contaminants including the moisture borne by said contaminants and preventing any reverse flow through said channels.

In summarizing the salient features, the discharge vanes have been rearranged to provide a larger passage for contaminants passing into the discharge channel and having vane portions sweeping through said discharge channels positively discharging all particulate substance and all moisture borne therewith.

Further there is positive prevention of any reverse passage of air or contaminant particles back into the air cleaner.

These and other objects and advantages will be set forth in the following description made in connection with the accompanying drawings bearing reference characters which refer to similar parts throughout the various views of the drawings.

BRIEF DESCRIPTION OF THE DRAWINGS

FIG. 4 is a view in vertical section of the upper portion of the device herein;

FIG. 5 is a view similar to that of FIG. 4 showing a separation of the upper and lower portions of the device herein;

DESCRIPTION OF A PREFERRED EMBODIMENT

Figure 1:
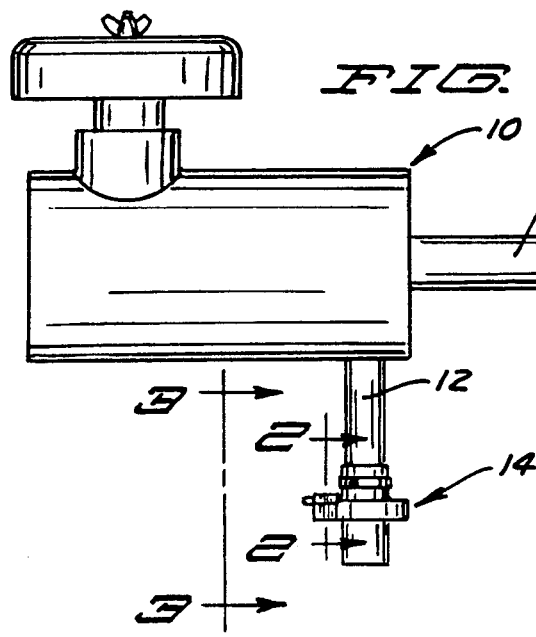
FIG. 1 is a view in side elevation of the device herein in operating position.

Referring to the drawings and more particularly to FIG. 1, an air cleaner 10 is shown of a type known in the prior art and the same is mounted on and supported by an air intake pipe 11 which as here indicated provides filtered air as to an internal combustion engine not here shown and the same may be otherwise utilized for a like purpose.

The invention herein relates to the device 14 which, as will be hereinafter described, comprises a power operated contaminant evacuator which is mounted upon the outlet or discharge pipe or sleeve 12 of said air cleaner for a positive discharge from said air cleaner of contaminants collected therein.

Said device 14 comprises an outer housing 17 consisting of two complementary interlocking upper and lower housing portions 19 and 21.

The upper portion 19 of said housing has for its external construction an annular horizontal flange 23 having an annular inset wall 24 disposed at right angles thereto depending therefrom in operating position and forming therebetween outwardly thereof an annular projecting shoulder 25. Said horizontal flange has a tangential projecting portion of itself forming an outlet 29 and in connection therewith said flange 24 has an opening 28 formed therein between the separated ends 24a and 24b of said wall 24. Projecting from said wall 24 are spaced lugs 26.

Upstanding centrally of said body portion 19 is an upward dome-like curved wall 30 having a substantial central opening 34 therein.

Adapted to be seated on said curved wall 30 is a cylindrical member 33 having a recessed bottom 35 adapted to receive therein said dome-like wall arcuate in cross section having an inwardly annular inclined wall 32 having therein a central opening 32a A vertical annular slot 32b is formed inwardly of said wall 30 and about said inclined wall 32.

Spaced oppositely from and partially about said curved wall 30 and adjacent the bottom thereof are a plurality of upstanding wall segments 36. Said segments are sufficiently flexible to yield to the pressure of a clamp strap member 40.

Said cylindrical member 33 in being seated on said curved wall 30 has frictional engagement with said wall segments 36.

In being mounted onto the air cleaner outlet pipe 12 which is disposed into said slot 32b, said strap clamp member 40 is placed about said segments 36 and then tightened securing said device 14 to said pipe 12. Said strap is tightened by a thumb screw 41.

Referring now to said horizontal flange 23, the same is extended forwardly to form a top wall 23a extending to overlie the separated ends 24a and 24b. At the forward edge of top wall, a rim retainer 23b is formed having an underlying slot 23c extending upwardly into said retainer forming a somewhat enlarged opening 23d to receive therein an upper portion 30a of a flexible rectangular member 31 which will depend to overlie said underlying discharge channel 51.

The lower body portion 21 will now be described. Said body portion 21 comprises an annular bottom plate member 39 having a central opening 39a therein and having a raised rim portion or wall 39b about said opening defining a channel 47 therein.

Secured to said body portion 21 depending therefrom and being suitably secured thereto underlying and being received into and sealing said opening 39a is an electric motor 42 of a conventional design appropriate for use herein. Preferably said motor will be of a design to rotate its shaft 42a on the order of 6000 rpm and will have a line extending to a suitable power source. Extending upwardly through said opening 39a is said drive shaft of said motor.

Overlying said opening 39a is a circular plate member 50.

The outer wall 39b of said channel 47 is adapted to receive therein said wall 24 and supported thereon will be said annular flange 23. Said wall 39b has angled slots 39c therein designed to receive said lugs 26 in releasable locking engagement by a slight relative circumferential movement of the housing portions 19 and 21.

Figure 2:
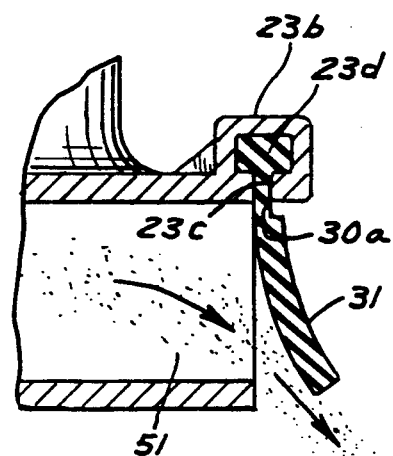
FIG. 2 is a view in vertical section taken on line 2—2 of FIG. 1 showing a detail on an enlarged scale.
Figure 3:
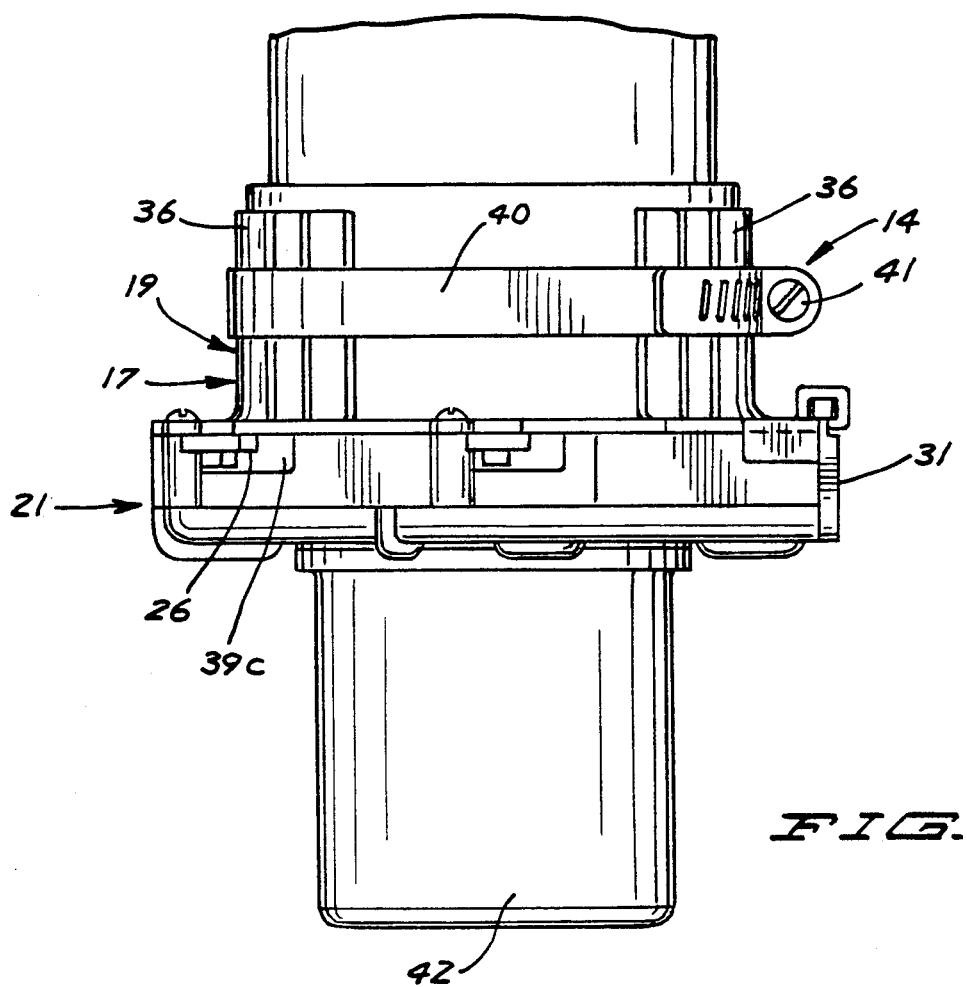
FIG. 3 is a view in side elevation taken on line 3—3 of FIG. 1 on an enlarged scale.
Figure 6:
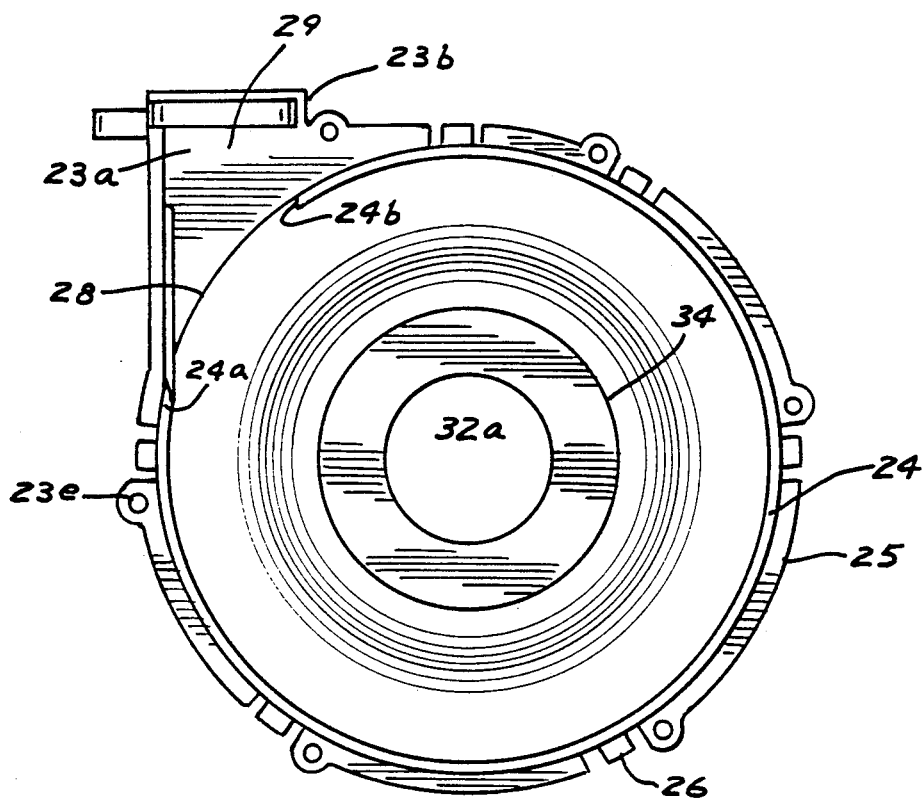
FIG. 6 is a bottom plan view taken on line 6—6 of FIG. 5 as indicated.
Figure 7:
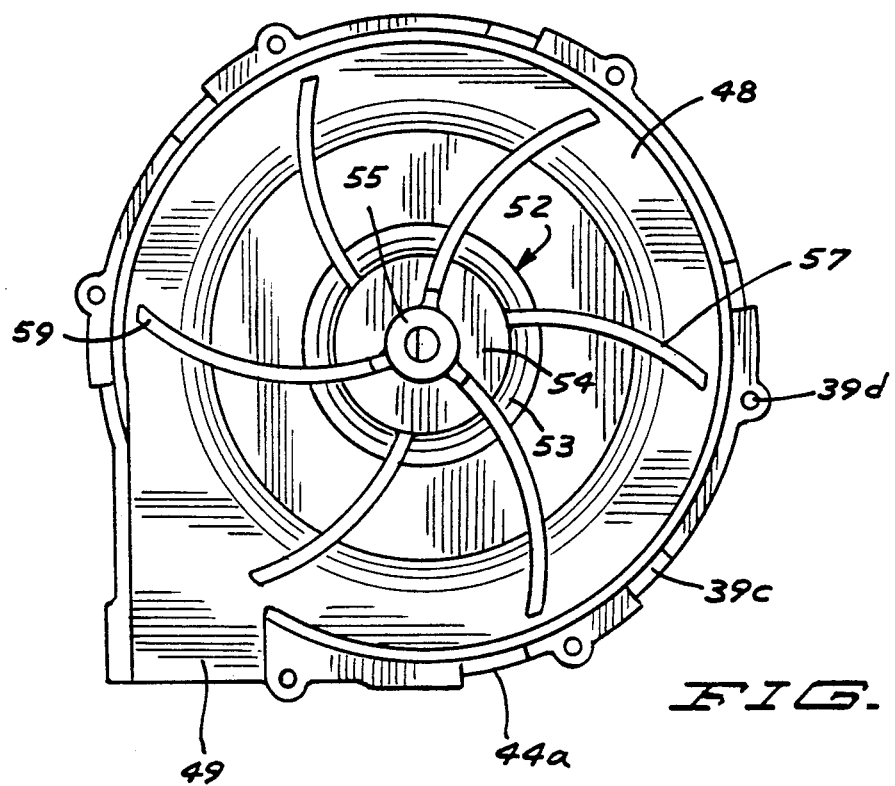
FIG. 7 is a top plan view taken on line 7—7 of FIG. 5 as indicated.

An inward annular portion of said plate member 50 has a shallow channel 48 formed therein and a tangential portion of said plate member, of said wall and of said channel form an outlet 49 corresponding with said outlet 29 in being complementary therewith and in underlying the same and formed thereby is a discharge port 51 as indicated in FIG. 2.

Seated upon said plate member 50 as shown in FIG. 5 is a contaminant discharging or evacuating means shown here in the form of an impeller 52.

Said impeller comprises a circular base plate member or disc 53 having a central raised portion 54 and extending upwardly thereof is a hub 55. Said hub has a non-round aperture 55a axially therethrough receiving therein said motor shaft 42a in a pressure fit.

Extending outwardly radially of said central raised portion 54 are a plurality of radially extending vanes 57 curved to the right as viewed being contrary to the direction of rotation. Said vanes each having a depending end portion 57a are disposed into and adapted to sweep through said channel 47 with a very slight clearance. A plurality of vanes 59 alternating with said vanes 57 extend radially from said hub 55 having engagement with said raised central portion 54 and said plate member 40 and having end portions 59a disposed to extend into said channel 47 and sweep therethrough having very slight clearance with the sides and bottom of said channel.

It will be noted that the vanes 59 extend outwardly from the lower portion of the hub 55 and the vanes 57 at their inner ends extending from the central portion 54 and are in a lower plane than said vanes 59. The hub is centered beneath the circular opening 32a. Thus said vanes are spaced downwardly sufficiently from the bottom of said opening 32a to provide a chamber 40a which provides ample free space for an incoming air stream to freely carry in and discharge a large continuous volume of contaminants onto the impeller 52 which discharges through the outlet port 51. Said chamber is of sufficient size to have readily discharged therefrom large particles of contaminants. Now with reference to FIG. 2, and said member 31 which covers said discharge port, said member is sufficiently flexible to yield to movement of air discharging contaminants through said port 51 and is readily seen having a swinging movement whereby the operator can readily see that the evacutor is in operation.

To assemble the housing portions 19 and 21, the same are superposed, the wall 24 is disposed within the channel 47 and the lugs 26 are aligned with the openings into the slots 44a and the outlet 29 is positioned in alignment with the outlet or discharge port 51. The housing portions are oppositely circumferentially partially rotated to lockingly engage said lugs within said locking slots. The flange 23 has spaced apertured ears 23e which overlie corresponding ears 39d projecting from the wall 39b and pins may be disposed through the same lock against relative rotation if desired.

There is ample space above said impellers to provide for a large volume discharge of contaminants to handle the most difficult contaminant producing conditions, said contaminants include particles from crop harvesting, dust laden atmosphere and dust combined with moisture as it is drawn into the air cleaner and evacuated therefrom through the sleeve 12 of said air cleaner into the evacuating device herein described.

OPERATION

The air cleaner of the type indicated at 10 will separate and collect from the air passing therethrough the entrained contaminants. The device positively evacuates contaminants from said air cleaner in having its own power source and in creating a low pressure area therein to accelerate passage thereinto of contaminants from said air cleaner. The device very successfully resists any effect thereon of any suction created by the engine to which the air cleaner is connected that evacuates into the device herein described.

The vanes 57 and 59 have end portions which depend into and sweep through said channel 47 and having such a clearance within said channel as to effectively sweep out all contaminant particles however small and the moisture as well carried therein by said contaminants.

The vanes in this device are designed with such close clearance with regard to adjacent side or bottom wall surfaces that the channel 47 is sealed against any quantity of air bypassing the vanes as has been indicated, the vanes effectively evacuate the discharge passage in its entirety. The vanes rotate in a counter clockwise direction only.

The invention has been well tested under operating conditions and has proved to be very successful.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. A positive discharge evacuating apparatus, having in combination
    a housing having an upper and a lower housing portion,
    means releasably securing said housing portions together,
    said upper housing portion comprising an annular horizontal flange, a vertical flange depending therefrom being inset from the periphery thereof forming an annular shoulder,
    said upper housing portion being curved upwardly and inwardly from said horizontal flange and forming an arced annular wall having a central opening therein, the inner portion of said upper housing, forming a demand chamber, a plurality of upstanding wall segments at opposite sides of said annular wall, a cylinder of flexible material having a recessed bottom adapted to be seated on said annular wall and disposed within and retained by said opposed wall segments, said cylinder having an upper chamber having an inwardly inclined wall defining a central opening at the bottom thereof, said cylinder having an annular vertical slot therein spaced inwardly from the upper periphery thereof, said lower housing portion having a chamber therein underlying said domed chamber and being substantially coextensive therewith, a bottom wall in said lower housing portion, a central opening in said bottom wall having a raised rim portion forming a channel thereabout, a motor mounted under said bottom wall and extending into said central opening, an impeller seated on said raised rim portion having a raised hub having an axial bore therethrough, a shaft from said motor extending into said hub in driving engagement therewith, said impeller having vanes extending into said channel, and a discharge outlet from said channel extending through said lower housing.

2. The structure of claim 1, wherein wherein said upper housing forms an upper wall about said second mentioned chamber, said upper wall corresponding with said lower wall about said channel in said lower housing portion and being adapted to be received therein, said upper wall depending from an annular fairly horizontal overlying wall thereabout, said upper wall having an opening therein corresponding to said opening in said lower wall and having a tangential projection thereof and of said overlying wall corresponding to said underlying projection forming a discharge port, the projection of said upper wall having an upwardly extending rim portion having a slotted bottom leading to an inward opening, a resilient flap member having an upper portion of reduced thickness disposed through said slot into said opening and overlying said discharge port, whereby said flap flutters when said apparatus is exhausting contaminants through said discharge port.

3. A positive discharge evacuating apparatus, having in combination a housing having an upper and a lower housing portion, means releasably securing said housing portions together, contaminant receiving means in said upper housing portion including, an annular chamber having a central discharge outlet, an enlarged dome shaped chamber underlying said first mentioned chamber and having said outlet discharge therein, said lower housing portion having a chamber therein underlying said second mentioned chamber and being substantially coextensive therewith, a bottom wall in said lower housing portion, a central opening in said bottom wall having a raised rim forming a channel thereabout, a motor mounted under said bottom wall and extending into said central opening, an impeller seated on said raised rim portion having a raised hub having an axial bore therethrough, a shaft from said motor extending into said hub in driving engagement therewith, said impeller having vanes extending into said channel, and a discharge outlet from said channel extending through said housing;

said contaminant receiving means in said upper housing portion comprising a cylinder of resilient material, said cylinder having an annular slot formed about said chamber therein, a plurality of yielding wall segments extend upwardly of said housing at opposite sides of said cylinder, and a strap clamp about said wall segments, whereby the sleeve of an air cleaner is disposed into said slot to have said housing mounted thereon and said strap is tightened to secure said sleeve.

4. The structure of claim 3, wherein said impeller comprises a bottom plate seated on said rim, said bottom plate having a central raised circular portion, having a periphery thereabout, said hub is upstanding from said raised circular portion, some of said vanes extend radially of said plate member from said periphery of said central raised portion, alternate of said vanes extend radially from said hub overlying said raised central portion and said plate portion, said vanes having end portions depending into and sweeping through said channel, and said vanes being curved radially in a direction opposite the direction of rotation of said vanes.

* * * * *